United States Patent
Yaman et al.

(10) Patent No.: US 11,541,439 B2
(45) Date of Patent: Jan. 3, 2023

(54) PERMEABLE REACTIVE BARRIER

(71) Applicant: Imam Abdulrahman Bin Faisal University, Dammam (SA)

(72) Inventors: Cevat Yaman, Dammam (SA); Ayse Burcu Yaman, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 142 days.

(21) Appl. No.: 17/242,998

(22) Filed: Apr. 28, 2021

(65) Prior Publication Data

US 2022/0347729 A1    Nov. 3, 2022

(51) Int. Cl.

| | |
|---|---|
| *B09C 1/00* | (2006.01) |
| *D06M 16/00* | (2006.01) |
| *B09C 1/10* | (2006.01) |
| *D04H 1/4291* | (2012.01) |
| *D04H 1/435* | (2012.01) |
| *D04H 1/4374* | (2012.01) |
| *C02F 3/10* | (2006.01) |
| *D04B 21/12* | (2006.01) |
| *C02F 3/34* | (2006.01) |
| *C02F 103/06* | (2006.01) |

(52) U.S. Cl.
CPC ............... *B09C 1/002* (2013.01); *B09C 1/10* (2013.01); *C02F 3/102* (2013.01); *C02F 3/34* (2013.01); *D04B 21/12* (2013.01); *D04H 1/4291* (2013.01); *D04H 1/435* (2013.01); *D04H 1/4374* (2013.01); *D06M 16/003* (2013.01); *B09C 2101/00* (2013.01); *C02F 2103/06* (2013.01); *C02F 2203/006* (2013.01); *D10B 2505/204* (2013.01)

(58) Field of Classification Search
CPC ....... B09C 1/002; B09C 2101/00; B09C 1/10; C02F 2103/06; C02F 2103/001; C02F 3/34; C02F 3/102; D04B 21/12; D04H 1/4291; D04H 1/435; D04H 1/4374; D06M 16/003
USPC ..... 210/150, 615; 405/128.15, 128.45, 128.7
See application file for complete search history.

(56) References Cited

U.S. PATENT DOCUMENTS

2009/0321351 A1    12/2009   Young

FOREIGN PATENT DOCUMENTS

| CA | 2639563 A1 * | 3/2010 | ......... B01D 39/1623 |
|---|---|---|---|
| CN | 106638221 A | 5/2017 | |

(Continued)

OTHER PUBLICATIONS

"SAM Permeable Reactive Barrier", ALBARRIE, https://www.albarrie.com/secondary-containment/sorbweb-plus-with-sam/, Feb. 8, 2021, 9 pages.

(Continued)

*Primary Examiner* — Claire A Norris
(74) *Attorney, Agent, or Firm* — Oblon, McClelland, Maier & Neustadt, L.L.P.

(57) ABSTRACT

A permeable reactive barrier having two or more layers of a geotextile fabric inoculated with a bioremediation microbe is provided. The permeable reactive barrier further includes two or more layers of coarse-grained geological material separating the two or more layers of geotextile fabric such that any pair of adjacent layers of geotextile fabric is separated by a layer of coarse-grained geological material. The permeable reactive barrier includes a perforated metal casing surrounding and containing the layers of coarse-grained geological materials and geotextile fabric.

20 Claims, 3 Drawing Sheets

(56) References Cited

FOREIGN PATENT DOCUMENTS

| | | | | |
|---|---|---|---|---|
| CN | 108821446 A | * | 11/2018 | ................ C02F 3/34 |
| CZ | 303 464 B6 | | 9/2012 | |
| KR | 10-1880351 B1 | | 7/2018 | |

OTHER PUBLICATIONS

I. Kalinovich, et al., "The application of geotextile and granular filters for PCB remediation", Geosynthetics International, vol. 15, No. 3, 2008, pp. 173-183.

G.E. Spicer, et al., "The development of geotextiles incorporating slow-release phosphate beads for the maintenance of oil degrading bacteria in permeable pavements", Water Science & Technology, vol. 54, No. 6-7, Feb. 2006, pp. 273-280.

* cited by examiner

PERMEABLE REACTIVE BARRIER

BACKGROUND OF THE INVENTION

Field of the Invention

The present disclosure relates to a permeable reactive barrier (PRB) and more particularly relates to a PRB inoculated with a bioremediation microbe and method of removing an organic pollutant from contaminated groundwater.

Discussion of the Background

Groundwater pollution is one of the major ongoing environmental problems besetting the human population. Groundwater is water present below the ground surface that saturates the pore space in the subsurface. While being underground makes groundwater less vulnerable to certain types of pollution such as runoff, this location also makes groundwater pollution more difficult to detect and remediate. Both organic and inorganic pollutants originating from sources such as human activities or soil leaching contribute towards polluting the groundwater. For example, industrial contaminants from oil refineries, underground storage tanks, and transmission pipelines often find their way into the groundwater. Due to the persistent nature of some of these pollutants, the pollutants may remain in the environment for extended periods of time, up to decades. Some pollutants pose severe health risks to humans, animals, and other living organisms.

To remedy the threat due to the pollution, groundwater remediation is considered the best option to make the water suitable for consumption. Groundwater remediation is the process that is used to treat polluted groundwater by removing the pollutants or converting them into harmless products. Groundwater remediation may be divided into two types: in situ remediation and "pump and treat" methods.

In pump and treat (P&T) methods, the groundwater is removed from the ground and treated. Such methods typically involve pumping the contaminated water to the surface, treating using chemical, biological and/or other treatment approaches, then either using the cleaned water or pumping it back into the ground. Such systems are limited, however, by being dependent on the hydrogeological and contaminant properties. Further, pump and treat methods are costly and require continuous energy input. While this strategy is particularly convenient for utilizing groundwater, it does not address ongoing environmental damage done by remaining polluted groundwater and may pose additional contamination risk during the pumping.

In contrast, in situ remediation treats contaminated groundwater where the water is situated or during natural hydrodynamic processes such as flow. One promising method of in situ remediation is to allow the groundwater to contact a permeable reactive barrier. Permeable reactive barriers (PRBs) technology involves the emplacement of a permeable barrier containing reactive materials along the flow path of the contaminated groundwater. The PRB will passively intercept and treat the contaminants as the plume flows through it under the influence of a natural hydraulic gradient. Contaminant removal is usually accomplished via processes such as adsorption, precipitation, denitrification and biodegradation. PRBs have low maintenance costs, low energy requirement, and longer life span compared to other conventional groundwater treatment methods such as P&T systems.

US20200290902 A1 by Sawyer John E (Sawyer) discloses an apparatus used to, e.g., prevent infestation of mollusks in water body comprising water-permeable, water-flow-restrictive covering, reticulated foam substrate encased water-permeable, copper and zinc fines and protective outer covering. The apparatus is useful for repelling or preventing infestation of mollusks in a body of water infested with mollusks or at risk of infestation by mollusks.

WO2016090330 A1 by Tetrault Christopher (Tetrault) discloses a textile barrier apparatus for forming superabsorbent barrier for a surface comprising aqueous superabsorbent polymer composition layer and outer textile layers attached to opposite sides of inner layer. The apparatus can be used for producing fire-retarding coatings for light or heavy ground-based firefighting equipment or aerial firefighting equipment.

US20160075576 A1 by Zimbron Julio A. (Zimbron) discloses a method of controlling of discharging of petroleum hydrocarbons discharged from groundwater to surface water at ground interface involves placing water and air transmissive mat containing oleophilic material in region of ground interface. Controlling of petroleum hydrocarbons discharged from groundwater to surface water at ground interface includes placing first water and air transmissive mat having upper surface and lower surface, containing oleophilic material which supports growth of naturally occurring microbes, with lower surface in contact with ground in region of ground interface, such that petroleum hydrocarbons are adsorbed by the first mat, and petroleum hydrocarbons are attenuated from biodegradation by microbes to prevent releasing to surface water. The patent application focuses on PRB use as a water and air transmissive mat for supporting growth of naturally occurring microbes for hydrocarbon biodegradation. The mat is configured to lay flat against the ground.

US20030035691 A1 by Sivavec Timothy M. (Sivavec) discloses permeable-reactive barrier monitoring comprises conducting permeable-reactive barrier treatment of contaminated aqueous medium, and in-well monitoring effectiveness of treatment. The disclosure includes a system comprising a PRB zone to treat contaminated groundwater, and an in-well sensor located within a gradient of the contaminated groundwater or within the PRB zone to identify a characteristic of the groundwater. The patent application focuses on using fabrics as an odor mitigating additive for use as a landfill cover/blanket.

Despite using PRB technology, the current state-of-the-art have still unresolved issues particularly the limited long term-performance of PRBs. The use of adsorbents, for example, limits the total amount of contamination that can be remediated before the adsorbent becomes saturated. Further, adsorbent and other types of PRBs may require frequent replenishment of certain components such as the frequent microbe replacement in US20160075576 A1. Such replenishment or other types of maintenance increase costs, negatively affecting adoption and full-scale implementation of PRBs. These cumbersome and lengthy procedures necessary to transform or immobilize contaminants create a need for a, fast, and economic configuration of PRBs to treat pollutants or contaminants, especially organic pollutants, present in the groundwater.

SUMMARY OF THE INVENTION

In one aspect, the present disclosure relates to a permeable reactive barrier (PRB). The PRB comprises two or more layers of a geotextile fabric inoculated with a bioremediation microbe and two or more layers of coarse-grained geological material separating the two or more layers of geotextile fabric such that any pair of adjacent layers of geotextile fabric is separated by a layer of coarse-grained geological material; and a perforated metal casing surrounds and contains the layers of coarse-grained geological materials and geotextile fabric.

In some embodiments, the geotextile fabric is a nonwoven geotextile fabric having a thickness of 0.9 to 2.5 mm at 2 kPa.

In some embodiments, the geotextile fabric is a nonwoven geotextile fabric having a mean apparent opening size of 75 to 125 μm and a water permeability of 50 to 150 mm/sec.

In some embodiments, the geotextile fabric is a nonwoven geotextile fabric comprising fibers of at least one polymer selected from the group consisting of polyethylene, polypropylene, polyethylene terephthalate, keratin, polylactic acid and cellulose. In some embodiments, the PRB comprises at least one layer of nonwoven geotextile fabric comprising polypropylene fibers and at least one layer of nonwoven geotextile fabric comprising polyethylene terephthalate fibers.

In some embodiments, the bioremediation microbe is at least one bacteria selected from the group consisting of genus *Pseudomonas*, genus *Dechloromonas*, genus *Deinococcus*, genus *Methyhbium*, and genus *Alcanivorax*. In some embodiments, the bioremediation microbe is present in the form of a biofilm.

In some embodiments, the coarse-grained geological material has a bulk density of 1.4 to 1.8 ton/m3. In some embodiments, the coarse-grained geological material comprises sand having a mean particle size of 0.5 to less than 7.5 mm. In some embodiments, the coarse-grained geological material comprises gravel having a mean particle size of 7.5 to 15 mm. In some embodiments, the layers of coarse-grained geological material have a geological material layer thickness of 1 to 10 cm.

In some embodiments, PRB further comprises at least one nutrient supplying additive selected from the group consisting of a nitrogen fertilizer, a phosphate fertilizer, a potassium fertilizer, a compound fertilizer, and an oxygen-supplying additive.

In some embodiments, the nutrient supplying additive is present in an amount of 0.025 to 10 wt % based on a total weight of the coarse-grained geological material.

The present disclosure also relates to an apparatus having a funnel-and-gate configuration wherein the gate comprises the PRB with two or more layers of a geotextile fabric inoculated with a bioremediation microbe and two or more layers of coarse-grained geological material separating the two or more layers of geotextile fabric such that any pair of adjacent layers of geotextile fabric is separated by a layer of coarse-grained geological material; and a perforated metal casing surrounds and contains the layers of coarse-grained geological materials and geotextile fabric.

In some embodiments, the gate of the apparatus has a gate thickness of 0.4 to 1.0 m, a gate height of 5 to 15 m, and a gate width of 15 to 45 m.

In some embodiments, the funnel of the apparatus has a funnel length of less than 500 m.

The present disclosure also relates to a method of removing an organic pollutant from a contaminated groundwater. The method comprises contacting the contaminated groundwater with the PRB with two or more layers of a geotextile fabric inoculated with a bioremediation microbe and two or more layers of coarse-grained geological material separating the two or more layers of geotextile fabric such that any pair of adjacent layers of geotextile fabric is separated by a layer of coarse-grained geological material; and a perforated metal casing surrounds and contains the layers of coarse-grained geological materials and geotextile fabric.

In some embodiments, the organic pollutant comprises at least one selected from the group consisting of benzene, toluene, ethylbenzene, ortho-xylene, meta-xylene, and para-xylene.

In some embodiments, the PRB is oriented substantially perpendicular to a groundwater flow comprising the contaminated groundwater.

These and other aspects and features of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Reference will now be made in detail to specific embodiments or features, examples of which are illustrated in the accompanying drawings. Wherever possible, corresponding or similar reference will be made throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

According to a first aspect, the present disclosure relates to a permeable reactive barrier (PRB) comprising two or more layers of a geotextile fabric inoculated with a bioremediation microbe, two or more layers of coarse-grained geological material separating the two or more layers of geotextile fabric such that any pair of adjacent layers of geotextile fabric is separated by a layer of coarse-grained geological material, and a perforated metal casing. The perforated metal casing surrounds and contains the layers of coarse-grained geological materials and geotextile fabric.

In some embodiments, the geotextile fabric is a nonwoven geotextile. In some embodiments, the nonwoven geotextile fabric has a thickness of 0.9 to 2.5 mm at 2 kPa, preferably 0.925 to 2.40, preferably 0.95 to 2.25 mm, preferably 0.975 to 2.15 mm, preferably 1.0 to 2.1 mm, preferably 1.04 to 2.04 mm at 2 kPa. In some embodiments, the non-woven geotextile fabric has a permeability of 50 to 120 mm/sec, preferably 60 to 115 mm/sec. In some embodiments, the layers of nonwoven geotextile fabrics may be placed in the PRB at 1 to 10 cm intervals, preferably 2 to 9 cm, preferably 3 to 8 cm, preferably 4 to 6 cm, preferably 5 cm intervals. In some embodiments, 2 to 24 layers are used, preferably 3 to 22 layers, preferably 4 to 20 layers, preferably 5 to 19 layers, preferably 6 to 18 layers, preferably 7 to 17 layers, preferably 8 to 16 layers, preferably 9 to 15 layers, preferably 10 to 14 layers, preferably 11 to 13 layers, preferably 12 layers of nonwoven geotextile are used. In preferred embodiments, the layers of nonwoven geotextile fabric are oriented substantially parallel to each other. In some embodiments, the nonwoven geotextile fabrics are produced by a needle punch procedure. In some embodiments, the nonwoven geotextile fabrics are produced by an aqua jet procedure. In some embodiments, the PRB is substantially free of woven geotextile fabrics. In some embodiments, the geotextile fabric is a nonwoven geotextile fabric having a mean apparent opening size of 75 to 125 μm, preferably 77.5 to 122.5 μm, preferably 80 to 120 μm, preferably 82.5 to 119 μm, preferably 83 to 118 μm, preferably 84 to 117 μm.

In some embodiments, the PRB is applied in cohesion soil environments. In some embodiments, the PRB is applied in non-cohesion soil environments. To ensure the suitability of the geotextile fabrics based on the soil environment, the permeability and suitability of the geotextile should be measured using a technique known to one of ordinary skill in the art. An example of such a technique is the falling-head test. The apparatus for falling-head test consists of a cylinder 5.08 cm in diameter with a 2.54-cm opening at the flanges. The geotextile is clamped within the flanges and all openings are sealed. To ensure air free environment, a vacuum of 64 cm of mercury is applied to a permeameter. The permeameter is filled with deaired, distilled water from the bottom with the applied vacuum. After noting the temperature, the time for the water level to fall from 30 to 10 cm above the geotextile fabric is recorded. The number of timings for each sample is determined after several repeat specimen testing. The number of repeats with one specimen requires to yield a mean time within 5 percent of the true mean with a 95 percent probability is calculated by using equation 1:

$$n_t = 0.154v^2 \quad (1)$$

where $n_t$ is the number of timings required and v is the coefficient of variation as a percentage. See Blair, et. al. [Blair, J. C., Bell, J. R., & Hicks, R. G., Permeability Testing of Geotextiles, Transportation Research Record, 827, In some embodiments, the geotextile fabric has attachment points such as grommets or reinforced holes. Such attachment points may be used to secure the fabric to the casing or other support structure. In some embodiments, the geotextile fabric has structural reinforcements such as gussets, a reinforcement grid, or sewn-in wires or poles. In some embodiments, the geotextile fabric has sealed or reinforced edges. In some embodiments, these attachment points interface with attachment structures such as hooks, protrusions, studs, clamps, and the like which are disposed on or otherwise connected to the perforated metal casing or support structure. Such an interfacing preferably allows the geotextile fabric to be attached to the perforated metal casing.

The nonwoven geotextile fabrics may be in the form of a sheet, web, or batt of directionally or randomly oriented fibers or filaments, bonded either by friction, and/or cohesion, and/or adhesion. In some embodiments, the geotextile fabric is a nonwoven geotextile fabric comprising fibers of at least one polymer selected from the group consisting of polyethylene, polypropylene, polyethylene terephthalate, keratin, polylactic acid and cellulose. In some embodiments, "degradable" or "resorbable" biodegradable fibers are used such as keratin, polylactic acid, or cellulose. Such fibers may be derived from natural sources such as cotton, coconut fibers, straw fibers, and wool. In some embodiments, the degradable fiber is a natural fiber from flax, jute, hemp, coconut, wool or a biodegradable polymer such as, polyhydroxyalkanoates, polycaprolactone, polyhydroxybutyrate, polybutylene succinate, or cellulose acetate. In some preferred embodiments, such biodegradable fibers are used in conjunction with a degradable or resorbable metal for the perforated metal casing to create a naturally-degradable PRB which is naturally destroyed or integrated into the environment after a prescribed period of time. The naturally-degradable PRB thus does not need to be removed from the environment following a remediation period.

In some embodiments, the nonwoven geotextile fabric comprises polyethylene terephthalate fibers. In some embodiments, the nonwoven geotextile fabric comprises polypropylene fibers. In some preferred embodiments, the nonwoven geotextile fabric comprises both polyethylene terephthalate fibers and polypropylene fibers. In some embodiments, the PRB comprises at least one layer, preferably at least two layers, preferably at least three layers, preferably at least four layers, preferably at least five layers, preferably at least six layers, preferably at least seven layers, preferably at least eight layers of nonwoven geotextile fabric comprising polypropylene fibers. In some embodiments, the PRB comprises at least one layer, preferably at least two layers, preferably at least three layers, preferably at least four layers of nonwoven geotextile fabric comprising polyethylene terephthalate fibers. In some preferred embodiments, the PRB comprises at least one layer, preferably at least two layers, preferably at least three layers, preferably at least four layers, preferably at least five layers, preferably at least six layers, preferably at least seven layers, preferably at least eight layers of nonwoven geotextile fabric comprising polypropylene fibers and at least one layer, preferably at least two layers, preferably at least three layers, preferably at least four layers of nonwoven geotextile fabric comprising polyethylene terephthalate fibers. As used herein, the terms, "polyethylene terephthalate fibers" and "polypropylene fibers" refer to the polymer of which the fiber is comprised. However, it should be understood that the fiber can have other components besides polypropylene as appropriate such as plasticizers, cross linkers, and other common additives known to one of ordinary skill in the art.

In some embodiments the geotextile fabric comprises a microbial support scaffold. The microbial support scaffold may be disposed on, attached to, integrated into, or otherwise connected with the geotextile fabric. The microbial support scaffold may be useful for the formation, maintenance, longevity, or proliferation of a microbial population in the PRB. For example, the microbial support scaffold can provide mechanical support and/or nutrients to the microbe. In some embodiments, the microbial support scaffold comprises fibers or other structure that is separate from the fibers of the geotextile fabric. Such microbial support scaffold fibers may be integrated into the geotextile fabric, for example by felting, such that the microbial support scaffold fibers become integrated into the structure of the geotextile fabric. Alternatively, such microbial support scaffold fibers may be disposed upon a surface of the geotextile fabric. In some embodiments, the microbial support scaffold comprises a microbial support coating disposed upon the geotextile fabric. In some embodiments, the microbial support coating is disposed upon the fibers of the geotextile fabric.

Examples of materials suitable for the support scaffold include hydrophilic polymers such as polyethylene glycol, polyvinyl alcohol, polyglutamic acid, polyvinyl pyrrolidone, polyacrylamide, polyethyleneimine, and polylactic acid and biopolymers such as starch, hyaluronic acid, collagen, alginate, chitosan, and agar. In some embodiments, the microbial support scaffold may be useful for allowing or aiding microbe adhesion to the geotextile fabric. The support structure is preferably fladry in the form of strips of a polylactic acid-based textile (e.g., textile strips having a dimension of 1-10 cm, preferably 2-5 cm, in width and a length that is 2-20 times, preferably 4-15 times or 6-10 times, the width of the fladry) and representing an areal fraction of 0.05-0.5 the exposed area of the PRB. In some embodiments, the microbial support scaffold may be useful for initial nourishment of the microbes. In some embodiments, such initial nourishment may be useful in establishing a self-sustaining population of the bioremediation microbe.

In some embodiments, the coarse-grained geological material has a bulk density of 1.4 to 1.8 ton/m$^3$, preferably 1.425 to 1.775 ton/m$^3$, preferably 1.45 to 1.75 ton/m$^3$, preferably 1.475 to 1.725 ton/m$^3$, preferably 1.5 to 1.7 ton/m$^3$. In some embodiments, the coarse-grained geological material comprises sand having a mean particle size of 0.5 to less than 7.5 mm, preferably 0.75 to 7 mm, preferably 1 to 6 mm. In some embodiments, the coarse-grained geological material comprises gravel having a mean particle size of 7.5 to 15 mm, preferably 8 to 12 mm. In some embodiments, the layers of coarse-grained geological material have a geological material layer thickness of 1 to 10 cm, preferably 2 to 9 cm, preferably 3 to 8 cm, preferably 4 to 6 cm, preferably 5 cm.

In some embodiments, the perforated metal casing comprises a corrosion resistant metal. In some embodiments, the perforated metal casing is constructed of a corrosion resistant metal. Examples of corrosion resistant metals include, but are not limited to stainless steel, e.g., 304, 316, or 430 stainless steel, galvanized steel, aluminum, or copper. Preferably, the metal is resistant to corrosion and oxidation in saline, acidic, or chloride-containing environments. Examples of such environments include environments which may contain seawater or brackish water, acidic soil, and environment contaminated with chloride-containing chemicals or perchlorate-containing chemicals. In some embodiments, the corrosion resistant metal has a corrosion rate of less than 50 µm/year, preferably less than 20 µm/year, preferably less than 10 µm/year, preferably less than 5 µm/year, preferably less than 2 µm/year, preferably less than 1 µm/year, preferably less than 0.5 µm/year, preferably less than 0.25 µm/year. In some embodiments, the corrosion resistant metal has a pitting resistance equivalent number (PREN) of greater than 30, preferably greater than 32, preferably greater than 35, preferably greater than 40. In some embodiments, the perforated metal casing comprises a coating. Such a coating may act as a physical or chemical barrier to protect the perforated metal casing from corrosion. Examples of coatings which may be used with the perforated metal casing include, but are not limited to, polymers and fluoropolymers, resins, epoxy coatings, ceramic coatings such as molybdenum disulfide, sacrificial coatings such as zinc (galvanizing), paints, and enamel coats.

In some embodiments, the perforated metal casing of the PRB is constructed of a biodegradable or a resorbable metal. In such embodiments, the perforated metal casing of the PRB is intended to be broken down or degraded by natural processes in the environment. Such biodegradable or resorbable metals may be used with other degradable components of the PRB intended to be broken down or degraded to create a naturally-degradable PRB as described above. Examples of biodegradable metals include biodegradable Mg alloys such as, Ca (Mg—Ca alloy) or with yttrium, neodymium and zirconium (WE43 alloys). In some embodiments, the biodegradable metal is a Fe-based alloy produced by adding manganese, palladium, and carbon (Fe—Mn—Pd alloy).

In some embodiments, the PRB further comprises geotextile layer supports. Such supports may be any suitable structure which mechanically supports the geotextile fabric while not impeding a flow of groundwater through the PRB. Examples of such structures include porous sheets, meshes, screens, and grids. In some embodiments, the geotextile layer supports are constructed of metal. In some embodiments, the geotextile layer supports are substantially the same metal as the perforated metal casing as described above. Preferably, the geotextile layer supports are oriented substantially parallel to the layers of geotextile fabric. In some embodiments, the geotextile layer supports are placed adjacent to the layers of geotextile fabric and oriented such that a groundwater flow passes through a layer of geotextile fabric before it passes through the geotextile layer support associated with that layer of nonwoven geotextile fabric (i.e. the geotextile layer support is oriented downstream from the layer of nonwoven geotextile fabric it supports).

In general, the perforated metal casing may have holes, perforations, or other openings of any suitable size. In some embodiments, the openings are sufficiently small so as to not permit the sand of the coarse-grained geological material from exiting. In such embodiments, the openings are 0.5 to less than 7.5 mm, preferably 0.75 to 7 mm, preferably 1 to 6 mm. In alternative embodiments, the openings are sufficiently small to as to not permit the gravel of the coarse-grained geological material from exiting, but are sufficiently large to permit the sand to exit. In such embodiments, the openings are 7.5 to 15 mm, preferably 8 to 12 mm. In other alternative embodiments, the openings may be sufficiently large so as to permit the gravel of the coarse-grained geological material to exit. In such embodiments, the openings are larger than 15 mm, preferably larger than 20 mm, preferably larger than 30 mm, preferably larger than 40 mm, preferably larger than 50 mm.

In some embodiments, the perforated metal casing comprises a removable lid. Such a lid may form a top of the perforated metal casing. Preferably, the removable lid should permit access to an interior volume of the perforated metal casing, preferably an entirety of such an interior volume. In some embodiments, the perforated metal casing comprises a maintenance hatch. In general, the maintenance hatch may be a reversibly coverable opening disposed in a surface of the perforated metal casing. Preferably, the maintenance hatch should permit access to an interior volume of the perforated metal casing, preferably an entirety of such an interior volume. In some embodiments, the removable lid may be useful for maintenance procedures associated with use of the PRB. In some embodiments, the maintenance hatch may be useful for maintenance procedures associated with use of the PRB. Examples of such maintenance procedures include, but are not limited to, testing of groundwater flowing through the PRB, assessing the quantity, health, quality, or other measure of the microbes, replenishing the a nutrient supplying additive, assessment of a geotextile fabric layer, and replacement or repair of one or more of the geotextile fabric layers and/or layers of coarse-grained geological material. In some embodiments, the removable lid and/or the maintenance hatch permits the removal and/or installation of a layer of nonwoven geotextile fabric and/or geotextile layer supports.

In some embodiments, one or more of the layers of coarse-grained geological material is encased in a geological material enclosure. Such a geological material enclosure may be any suitable structure known to one of ordinary skill in the art, for example a mesh, cage, or metal casing as described above. In general, the geological material enclosure(s) may be substantially the same as the metal casing. In some embodiments, the geological material enclosures are intended and configured to be removable. Such removal may be useful for a maintenance procedure as described above. In some embodiments, the metal casing comprises geological material enclosure supports. Such supports may be in the form of, for example, rails or other structure disposed on one or more sides of the metal casing which permit the geological material enclosures to be reversibly secured.

In preferred embodiments, the layers of nonwoven geotextile fabric are oriented substantially perpendicular to a normal groundwater flow. In this configuration, the normal groundwater flow passes through the PRB, allowing the PRB to treat the groundwater. In some embodiments, the normal groundwater flow passes through at least 1 layer of geotextile fabric, preferably at least 2, preferably at least 3, preferably at least 4, preferably at least 5, preferably at least 6, preferably all of the layers of geotextile fabric.

In some embodiments, the bioremediation microbe is at least one bacteria selected from the group consisting of genus *Pseudomonas,* genus *Dechloromonas,* genus *Deinococcus,* genus *Methyhbium,* and genus *Alcanivorax.* In some embodiments, the bioremediation microbe is disposed on the geotextile fabric.

The geotextile fabrics should be able to host the bioremediation mirobe while maintaining acceptable permeability of the fabric filter. In some embodiments, the bioremediation microbe is present in the geotextile pores in the form of discontinuous flocs. Such a configuration may be advantageous for providing a high surface area yet leaving most of the pore space for the liquid passage [*J. Environ. Eng.* 2005, 131, 1667-1675. incorporated by reference herein in its entirety.]. Flow of contaminated groundwater through the geotextile fabric which hosts the bioremediation microbe may provide intimate contact between the bioremediation microbe and the pollutants. In some embodiments, the bioremediation microbe is present in the form of a biofilm. In some embodiments, the bioremediation microbe may form a uniform microbial biofilm layer embedded within extracellular polymeric substances on the surface of the geotextile fabric. Such a biofilm may help to capture the organic pollutants and/or provide sufficient porosity to let the purified water to pass through. In some embodiments, the PRB is substantially free of microbes from the genus *Methylocystis.* In some embodiments, the PRB is substantially free of microbes from the genus *Methylosarcina.* In some embodiments, the PRB is substantially free of microbes from the genus *Methylocaldum.* In some embodiments, the PRB is substantially free of microbes from the genus *Sphingomonas.* In some embodiments, the PRB is substantially free of microbes from the genus *Methylocystis,* genus *Methylosarcina,* genus *Methylocaldum,* and genus *Sphingomonas.*

In some embodiments, the PRB further comprises at least one nutrient supplying additive selected from the group consisting of a nitrogen fertilizer, a phosphate fertilizer, a potassium fertilizer, a compound fertilizer, and an oxygen-supplying additive. In some embodiments, the PRB further comprises an oxygen-supplying additive and at least one nutrient supplying additive selected from the group consisting of a nitrogen fertilizer, a phosphate fertilizer, a potassium fertilizer, and a compound fertilizer. In general, the nitrogen fertilizer may be any suitable nitrogen fertilizer known to one of ordinary skill in the art. Examples of nitrogen fertilizers include, but are not limited to ammonium nitrate, ammonium halides such as ammonium chloride, ammonium sulfate, calcium nitrate, urea, diammonium phosphate, and cal-nitro (a mixture of ammonium nitrate and limestone). In preferred embodiments, the nitrogen fertilizer is a solid nitrogen fertilizer. In preferred embodiments, the nitrogen fertilizer is ammonium chloride. In general, the phosphate fertilizer may be any suitable phosphate fertilizer known to one of ordinary skill in the art. Examples of phosphate fertilizers include, but are not limited to single superphosphate, triple superphosphate, monoammonium phosphate, diammonium phosphate, ammonium polyphosphate, rock phosphate (fluoroapatite), bonemeal, potassium phosphate, potassium hydrogen phosphate, potassium dihydrogen phosphate, and calcium phosphate. In preferred embodiments, the phosphate fertilizer is a solid phosphate fertilizer. In preferred embodiments, the phosphate fertilizer is potassium dihydrogen phosphate. In general, the potassium fertilizer may be any suitable potassium fertilizer known to one of ordinary skill in the art. Examples of potassium fertilizers include, but are not limited to potassium chloride, potassium nitrate, potassium sulfate, potassium phosphate, potassium hydrogen phosphate, potassium dihydrogenphosphate, and potassium magnesium sulfate. A compound fertilizer is a fertilizer which acts a source of two or more nutrients selected from the group consisting of potassium, nitrogen, and phosphate. Examples of compound fertilizers include potassium phosphate, potassium hydrogen phosphate, potassium dihydrogen phosphate, ammonium phosphate, ammonium hydrogen phosphate, and ammonium dihydrogen phosphate. In general the oxygen-supplying additive may be any suitable oxygen-supplying additive known to one of ordinary skill in the art. Examples of oxygen-supplying additives (also known as oxygen releasing compounds) include, but are not limited to calcium oxide, calcium peroxide, magnesium peroxide, and sodium peroxide. In preferred embodiments, the oxygen-supplying additive is calcium peroxide.

In some embodiments, the nutrient supplying additive is present in an amount of 0.025 to 10 wt %, preferably 0.05 to 9.0 wt %, preferably 0.67 to 7.0 wt %, based on a total weight of the coarse-grained geological material. In general, the nutrient supplying additive may be anywhere within the perforated metal casing. In some embodiments, the nutrient supplying additive is present in a nutrient additive layer disposes adjacent to a geotextile fabric layer such that the nutrient additive layer is in contact with the geotextile fabric layer. In such embodiments, the nutrient additive layer may be separate from, but adjacent to and/or in contact with a coarse-grained geological material layer. In alternative embodiments, the nutrient supplying additive may be dispersed with one or more coarse-grained geological material layers. In such embodiments, the nutrient supplying additive is preferably uniformly distributed throughout a volume of a coarse-grained geological material layer. In some embodiments, the nutrient additive is dispersed uniformly throughout all of the coarse-grained geological material layers.

The nutrient supplying additive may provide nutrients essential for the growth and/or survival of the bioremediation microbe. Additionally, the oxy-supplying additive may provide oxygen necessary for oxidative processes involved in the degradation of the organic pollutant.

In another aspect, the present disclosure also relates to an apparatus having a funnel-and-gate configuration wherein the gate comprises the PRB described above.

In some embodiments, the gate of the apparatus has a gate thickness of 0.4 to 1.0 m, preferably 0.45 to 0.9 m, preferably 0.5 to 0.8 m, preferably 0.55 to 0.75 m, preferably 0.6 to 0.7 m, preferably 0.65 m. In some embodiments, the gate of the apparatus has a gate height of 5 to 15 m, preferably 6 to 14 m, preferably 7 to 13 m, preferably 8 to 12 m, preferably 9 to 11 m, preferably 10 m. In some embodiments, the gate of the apparatus has a gate width of 15 to 45 m, preferably 16 to 44 m, preferably 17 to 43 m, preferably 18 to 42 m, preferably 19 to 41 m, preferably 20 to 40 m, preferably 21 to 39 m, preferably 22 to 38 m, preferably 23 to 37 m, preferably 24 to 36 m, preferably 25 to 35 m, preferably 26 to 34 m, preferably 27 to 33 m, preferably 28 to 32 m, preferably 29 to 31 m, preferably 30 m.

In some embodiments, the funnel of the apparatus has a length of less than 500 m, preferably less than 475 m, preferably less than 450 m, preferably less than 425 m, preferably less than 400 m, preferably less than 375 m, preferably less than 350 m, preferably less than 325 m, preferably less than 300 m. The funnel length refers to the length of an impermeable funnel wall which extends out from the PRB. As the impermeable funnel wall may be placed at a variety of angles with respect to a plane defined by the PRB, the maximum distance in a horizontal direction (parallel to the plane defined by the PRB) and maximum distance in a longitudinal direction (perpendicular to the plane defined by the PRB) may be less than the funnel length. In such cases, the funnel length may be considered to be the hypotenuse of a triangle with legs of the maximum distance in a horizontal direction and the maximum distance in a longitudinal direction. In some embodiments, the impermeable funnel wall is oriented at an angle of 0° to 60° with respect to the plane defined by the PRB. In such a configuration, an angle of 0° would refer to a configuration where the impermeable funnel wall is parallel with the plane defined by the PRB and all of the funnel length is in a horizontal direction. In general, the funnel is defined by two such impermeable funnel walls. These walls may be placed at substantially the same angle or at substantially different angles with respect to the plane defined by the PRB.

In some embodiments, the funnel comprises plume directors. In general, the plume directors may be any suitable structure known to one of ordinary skill in the art which are useful for directing or facilitating flow of the plume of contaminated groundwater toward the gate. Examples of such structures include, but are not limited to perforated pipes, channels, wicks, or rods. Preferably, such structures are oriented to place a gate end of the structure proximal to the gate and a plume end of the structure distal from the gate. This orientation may be at a plume director angle of about 30 to 90° relative to a plane defined by the PRB. In some embodiments, the plume directors comprise a hydrophilic polymer as described above. In some embodiments, the plume directors comprise an oleophilic polymer. Examples of oleophilic polymers include, but are not limited to polyethylene terephalate, polypropylene, polyurethane, polypyrrole, polyvinylchloride, polytetrafluorethylene, and polydimethylsiloxane.

In some embodiments, the PRB is oriented substantially perpendicular to a groundwater flow comprising the contaminated groundwater. In this configuration, the groundwater flow passes through the PRB, allowing the PRB to treat the groundwater. In some embodiments, the normal groundwater flow passes through at least 1 layer of geotextile fabric, preferably at least 2, preferably at least 3, preferably at least 4, preferably at least 5, preferably at least 6, preferably all of the layers of geotextile fabric. The PRB is placed below the water table allowing a natural hydraulic gradient for bioremediating groundwater contaminated with organic and inorganic impurities.

The apparatus is preferably placed in such a way that a plume of contaminated groundwater is captured by the funnel and flows through the PRB. Preferably, an entirety of the plume of contaminated groundwater is captured by the funnel and flows through the PRB. In some embodiments, such a flow is naturally or is directed by the funnel to be in a substantially perpendicular direction through the PRB. In some embodiments, the apparatus is placed below the water table allowing natural hydraulic gradient for bioremediating the groundwater contaminated with organic and/or inorganic impurities. The placement of the apparatus ensures the upgradient contaminated groundwater gets decontaminated after reaching downgradient.

The present disclosure also relates to a method of removing an organic pollutant from a contaminated groundwater. The method comprises contacting the contaminated groundwater with the PRB described above. The contacting can take place in the bioremediation apparatus, a storm runoff catch system, or any other apparatus, for example an apparatus that has an inflow portion and a pooling portion and an exit/outflow portion that funnels/directs water to pass through the barrier and filtering the contaminated water into clean water.

In some embodiments, the organic pollutants may be a dye, a phenol, a polycyclic aromatic hydrocarbon, an herbicide, a pesticide, a persistent organic pollutant, a BTX organic pollutant, or the like.

In some embodiments, the organic pollutant is a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dib enzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor,alachlor, metolachlor, dimethenamid, flufenacet, and pyroxasulfone.

A pesticide is a substance meant to prevent, destroy, or control pests including, but not limited to, algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Pollutants. Examples of persistent organic pollutants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane ($\alpha$- and $\beta$-), hexabromodiphenyl ether, lindane, pentachlorobenzene, tetrabromodiphenyl ether, perfluorooctanesulfonic acid, endosulfans, and hexabromocyclododecane.

A BTX organic pollutant refers to a pollutant selected from benzene, toluene, ethylbenzene, ortho-xylene, meta-xylene, para-xylene, and mixtures thereof.

In some embodiments, the organic pollutant comprises at least one selected from the group consisting of benzene, toluene, ethylbenzene, ortho-xylene, meta-xylene, and para-xylene. In some embodiments, the organic pollutant further includes precursor, intermediates or derivatives of benzene, toluene, ethylbenzene, ortho-xylene, meta-xylene, and para-xylene.

In some embodiments, the reactive barrier may also remove inorganic pollutants. Such inorganic pollutants may include nitrates, sulfates, perchlorates and metals including lead, arsenic, chromium, uranium, nickel, zinc, and iron.

Figure 1:
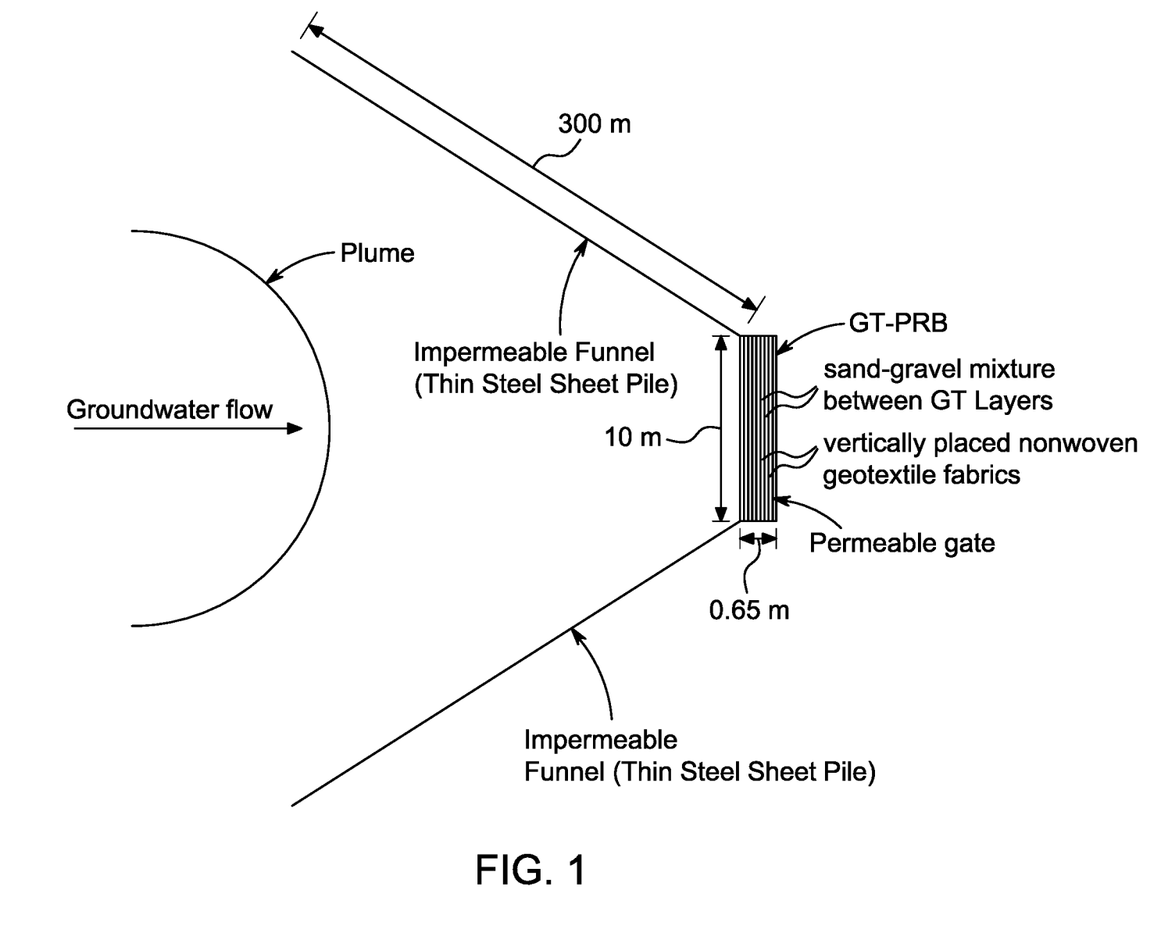
FIG. 1 illustrates a schematic plan view of an exemplary PRB funnel and gate system, according to an embodiment of the present disclosure.

Reference will now be made to the figures illustrating the various components and configuration of the PRB and the PRB apparatus. FIG. 1 illustrates a plan view of an exemplary groundwater treatment system comprising the PRB. The treatment system is a funnel and gate type system which includes funnel walls to direct the groundwater towards a gate which has the PRB to filter and treat the groundwater as the groundwater passes through the gate. In the present funnel and gate system, the gate consists of the permeable reactive barrier and is placed between two impermeable funnel walls that direct the contaminated plume towards the reactive zone or prevent the contaminated groundwater from flowing past the system. In general, the mechanisms of interaction in a PRB include degradation, precipitation, and sorption. Reactive materials used in a PRB may affect pH or redox potential, cause precipitation, have high sorption capacity, and/or release nutrients and oxygen to enhance degradation. In the PRB of the current invention, the bioremediation microbes present in the PRB cause degradation or biodegradation of pollutants present in the groundwater. In this context, the bioremediation microbes may be considered to be a reactive material. In some embodiments, the PRB is used in conjunction with other reactive materials or additives. Examples of such other reactive materials include sorbents and zero valent iron.

In the present system, the length of the barrier is longer than the horizontal extent of the plume such that the bioremediation is effective and treats an entirety of the plume. In some embodiments, the impermeable funnel walls comprise non-perforated metal sheets ensuring the groundwater moves in the direction of the gate. In some embodiments, the metal sheets are constructed of a corrosion resistant metal as described above. In alternative embodiments, the metal sheets are constructed of a resorbable or degradable metal as described above. The length of the funnel may be adjustable depending on the extent of the plume. However, each funnel may be up to 500 meters, preferably 475 meters, preferably 450 meters, preferably 425 meters, preferably 400 meters, preferably 375 meters, preferably 350 meters, preferably 325 meters, preferably 300 meters in length as described above. In the exemplary embodiment depicted in FIG. 1, the funnel length is 300 m. In some embodiments, a second PRB may be installed where a horizontal extent of the plume exceeds 300 meters.

Figure 2:
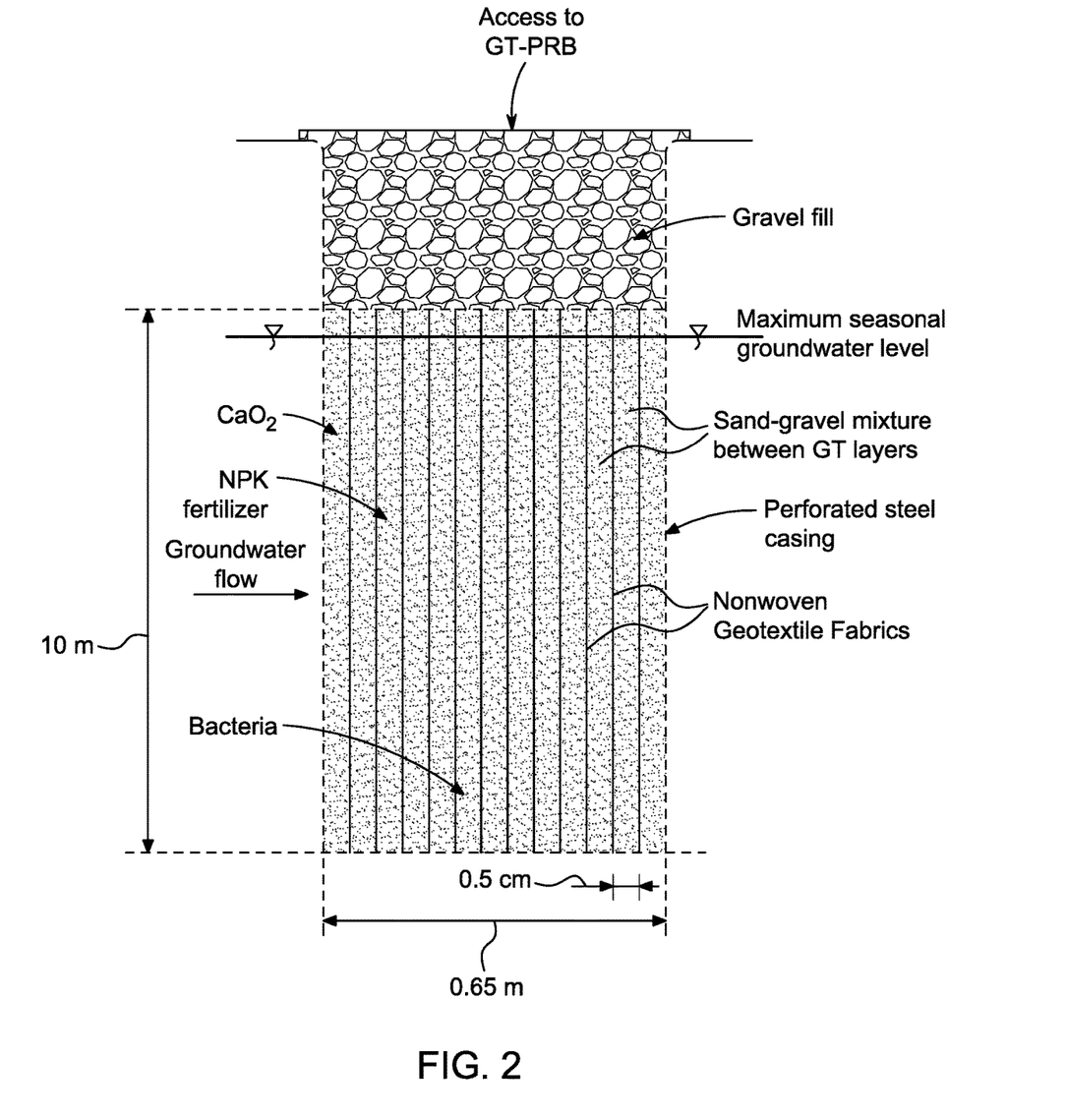
FIG. 2 illustrates a cross-sectional view of an exemplary PRB system, according to an embodiment of the present disclosure.

In reference to FIG. 2, an exemplary embodiment of the gate of the system including the PRB having two or more layers of the geotextile fabric inoculated with the bioremediation microbe is depicted. The PRB further includes the two or more layers of the coarse-grained geological material separating the two or more layers of geotextile fabric such that any pair of the adjacent layers of the geotextile fabric is separated by the layer of the coarse-grained geological material. The PRB includes the perforated metal casing surrounding and containing the layers of the coarse-grained geological materials and the geotextile fabric. Since, the PRB system is constructed and intended to be located below the water table, appropriate fill material may be placed on top of the PRB as depicted in FIG. 2.

Figure 3:
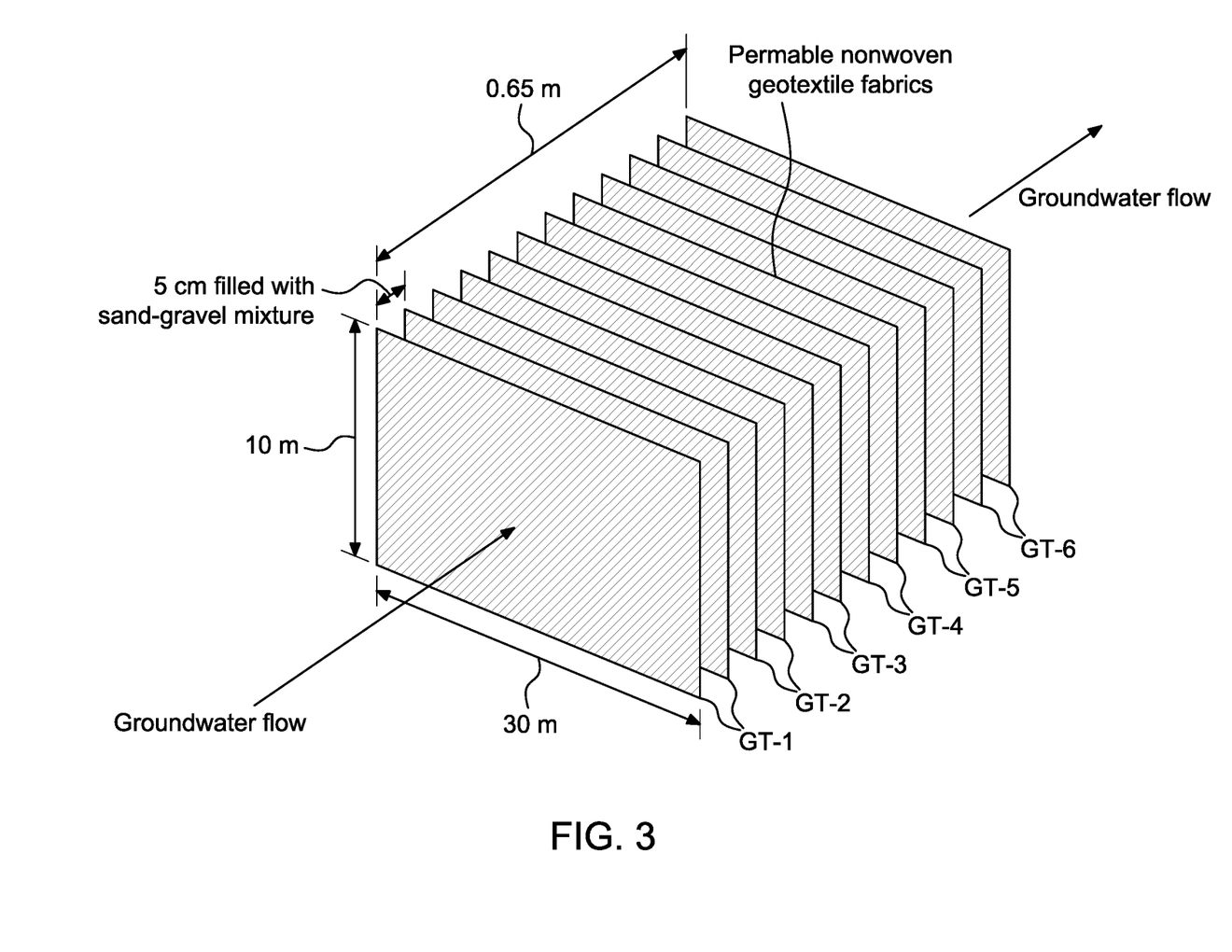
FIG. 3 illustrates a perspective view of the geotextile fabric layers in the exemplary PRB system, according to an embodiment of the present disclosure.

In some embodiments, 12 layers of the nonwoven geotextile fabrics are placed in the PRB at 5 cm intervals perpendicular to groundwater flow as depicted in the exemplary embodiment shown in FIG. 3. In some embodiments, six types of the geotextile fibers with different dimensions are used in the 12 layers. Table 1 below depicts an exemplary embodiment of the PRB of the current invention and includes specifications for type and characteristics of the geotextile fabrics. It should be noted that this table is for exemplary purposes only and is not indented to limit the scope of the disclosure and/or claims.

TABLE 1

Properties and locations of geotextile fabrics used in the PRB

| Geotextile name | Location in PRB | Thickness @ 2 kPa (mm) | Apparent Opening Size (AOS) (μm) | Permeability (mm/sec) | Polymer Type | Production method |
|---|---|---|---|---|---|---|
| GT-1 | Layer 1 and 2 | 1.95 | 116.75 | 115.00 | Polypropylene (PP) | Needle punch |
| GT-2 | Layer 3 and 4 | 1.95 | 116.75 | 115.00 | PP | Needle punch |
| GT-3 | Layer 5 and 6 | 1.95 | 116.75 | 115.00 | PP | Needle punch |
| GT-4 | Layer 7 and 8 | 1.95 | 116.75 | 115.00 | PP | Needle punch |
| GT-5 | Layer 9 and 10 | 1.95 | 116.75 | 115.00 | Polypropylene (PET) | Needle punch |
| GT-6 | Layer 11 and 12 | 1.95 | 116.75 | 115.00 | PET | Needle punch |

The groundwater velocity and porosity of the materials used affect the viability of the PRB, both in terms of the integrity of the PRB and in terms of the effectiveness of the remediation. For example, the pollutants or contaminants must remain within the PRB for a sufficient amount of time for degradation to occur. The amount of time a given volume of water remains in the PRB as part of a groundwater flow is referred to as the residence time. The residence time is a useful indicator estimating the volumetric rate of ground water flow through the PRB and may be useful for adjusting parameters of the PRB such as geotextile fabric layer spacing, coarse-grained geological material layer thickness, and the like. The residence time in the PRB has an inverse relationship to groundwater velocity (high velocity leads to low residence time). Since the funnel captures groundwater from a larger volume than would normally flow through the volume occupied by the PRB, the groundwater velocity and/or volumetric flow can increase, in some cases up to five times the natural velocity and/or volumetric flow. Darcy's law equation helps to estimate the flow of a fluid through a porous medium, in the present PRB system, the Darcy variables may be considered in the designing of the PRB. The exemplary embodiment described herein is designed for a groundwater velocity of 0.3 m/day. Thus, if the groundwater velocity is less than 0.3 m/day, the exemplary PRB design presented here is ideal. In cases in which the velocity is higher than 0.3 m/day, the effectiveness of the exemplary PRB design presented here may be reduced, especially, when chlorinated hydrocarbons are treated.

In some embodiments, total volume of the PRB is up to 195 m$^3$. Table 2 below depicts an exemplary embodiment of the PRB of the current invention and includes specifications for type and characteristics of the coarse-grained geological material. It should be noted that this table is for exemplary purposes only and is not indented to limit the scope of the disclosure and/or claims. In some embodiments, the PRB has a porosity after filling with the coarse-grained geological material of 22%. In one exemplary embodiment, the volume of coarse-grained geological material is 140.4 m$^3$. In some embodiments, the mass or weight of coarse-grained geological materials is 224.6 tons.

TABLE 2

Properties and amounts of filler material in the PRB

| Material | Diameter (mm) | % of SiO$_2$ | % of acid solubility (1:1 HCl) | Bulk density (t/m3) | Specific gravity | Hardness (Moh's scale) | Amount (ton) |
|---|---|---|---|---|---|---|---|
| Silica sand | 1-2 | 98% +/- 1 | 1 +/- 0.5 | 1.5-1.70 | 2.55-2.70 | 7.0 | 56.16 |
| Silica sand | 2-3 | 98% +/- 1 | 1 +/- 0.5 | 1.5-1.70 | 2.55-2.70 | 7.0 | 56.16 |
| Silica sand | 3-6 | 98% +/- 1 | 1 +/- 0.5 | 1.5-1.70 | 2.55-2.70 | 7.0 | 56.16 |
| Silica gravel | 8-12 | 98% +/- 1 | 1 +/- 0.5 | 1.5-1.70 | 2.55-2.70 | 7.0 | 56.16 |

In some embodiments, the PRB treats 30 m³ of organic contaminated plume per day where the groundwater velocity is 0.3 m/day.

Various, embodiments, examples and dimension of the components used in the disclosure are merely exemplary. Any person skilled in the relevant art may perform numerous modifications and variations of the present disclosure such as shape, size, position or orientation of the components involved in the invention in light of the above teachings. It is therefore to be understood that within the scope of the appended claims, the invention may be practiced otherwise than as specifically described herein.

The invention claimed is:

1. A permeable reactive barrier, comprising:
    two or more layers of a geotextile fabric inoculated with a bioremediation microbe;
    two or more layers of coarse-grained geological material separating the two or more layers of geotextile fabric such that any pair of adjacent layers of geotextile fabric is separated by a layer of coarse-grained geological material; and
    a perforated metal casing,
    wherein the perforated metal casing surrounds and contains the layers of coarse-grained geological materials and geotextile fabric.

2. The permeable reactive barrier of claim 1, wherein the geotextile fabric is a nonwoven geotextile fabric having a thickness of 0.9 to 2.5 mm at 2 kPa.

3. The permeable reactive barrier of claim 1, wherein the geotextile fabric is a nonwoven geotextile fabric having a mean apparent opening size of 75 to 125 μm and a water permeability of 50 to 150 mm/sec.

4. The permeable reactive barrier of claim 1, wherein the geotextile fabric is a nonwoven geotextile fabric comprising fibers of at least one polymer selected from the group consisting of polyethylene, polypropylene, polyethylene terephthalate, keratin, polylactic acid and cellulose.

5. The permeable reactive barrier of claim 4, comprising at least one layer of nonwoven geotextile fabric comprising polypropylene fibers and at least one layer of nonwoven geotextile fabric comprising polyethylene terephthalate fibers.

6. The permeable reactive barrier of claim 1, wherein the bioremediation microbe is at least one bacteria selected from the group consisting of genus *Pseudomonas*, genus *Dechloromonas*, genus *Deinococcus*, genus *Methylibium*, and genus *Alcanivorax*.

7. The permeable reactive barrier of claim 1, wherein the bioremediation microbe is present in the form of a biofilm.

8. The permeable reactive barrier of claim 1, wherein the coarse-grained geological material has a bulk density of 1.4 to 1.8 ton/m³.

9. The permeable reactive barrier of claim 1, wherein the coarse-grained geological material comprises sand having a mean particle size of 0.5 to less than 7.5 mm.

10. The permeable reactive barrier of claim 1, wherein the coarse-grained geological material comprises gravel having a mean particle size of 7.5 to 15 mm.

11. The permeable reactive barrier of claim 1, wherein the layers of coarse-grained geological material have a geological material layer thickness of 1 to 10 cm.

12. The permeable reactive barrier of claim 1, further comprising at least one nutrient supplying additive selected from the group consisting of a nitrogen fertilizer, a phosphate fertilizer, a potassium fertilizer, a compound fertilizer, and an oxygen-supplying additive.

13. The permeable reactive barrier of claim 1, further comprising an oxygen-supplying additive and at least one nutrient supplying additive selected from the group consisting of a nitrogen fertilizer, a phosphate fertilizer, a potassium fertilizer, and a compound fertilizer.

14. The permeable reactive barrier of claim 12, wherein the nutrient supplying additive is present in an amount of 0.025 to 10 wt % based on a total weight of the coarse-grained geological material.

15. A groundwater bioremediation apparatus having a funnel-and-gate configuration wherein the gate comprises the permeable reactive barrier of claim 1.

16. The groundwater bioremediation apparatus of claim 15, wherein the gate has a gate thickness of 0.4 to 1.0 m, a gate height of 5 to 15 m, and a gate width of 15 to 45 m.

17. The groundwater bioremediation apparatus of claim 15, wherein the funnel has a funnel length of less than 500 m.

18. A method of removing an organic pollutant from a contaminated groundwater, the method comprising contacting the contaminated groundwater with the permeable reactive barrier of claim 1.

19. The method of claim 18, wherein the organic pollutant comprises at least one selected from the group consisting of benzene, toluene, ethylbenzene, ortho-xylene, meta-xylene, and para-xylene.

20. The method of claim 18, wherein the permeable reactive barrier is oriented substantially perpendicular to a groundwater flow comprising the contaminated groundwater.

* * * * *